July 18, 1933. W. HUBBARD 1,919,063
CONVERTIBLE BODY OF VEHICLES
Filed Sept. 17, 1930 2 Sheets-Sheet 1
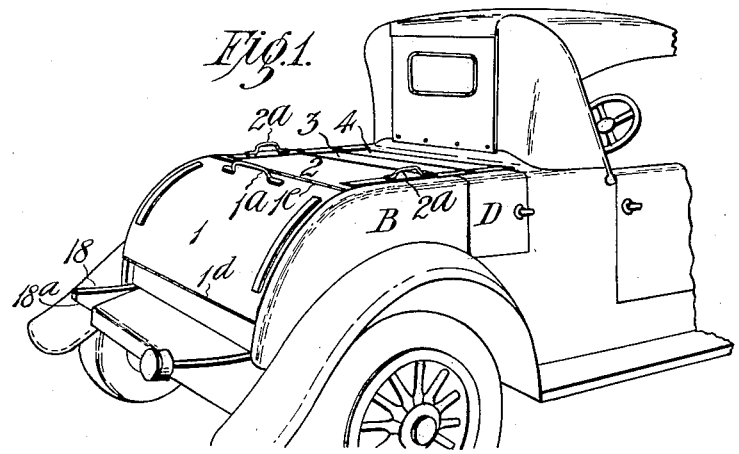
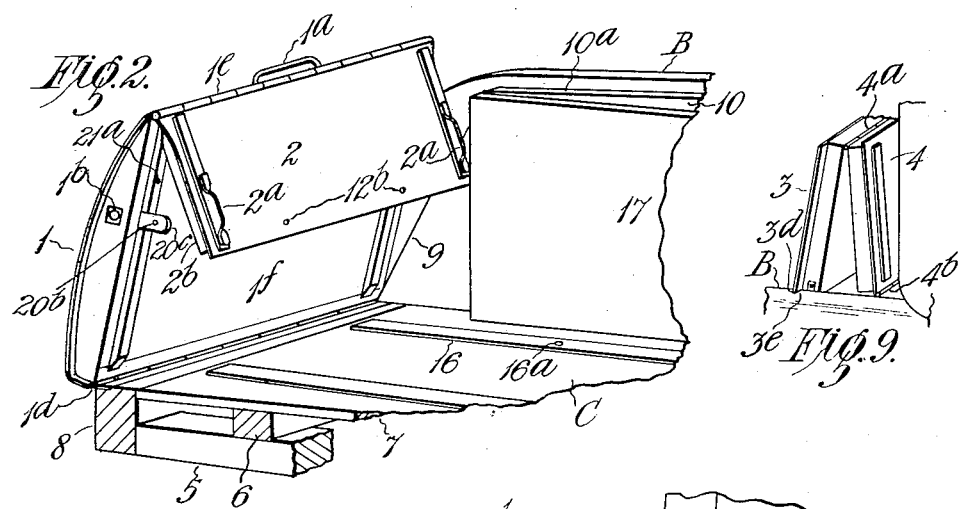
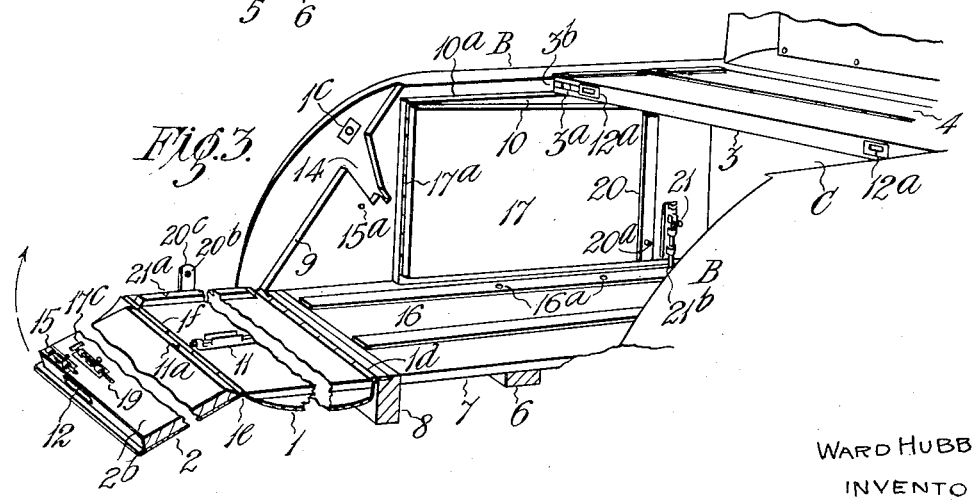
WARD HUBBARD
INVENTOR;
By [signature]
His Attorney.

July 18, 1933. W. HUBBARD 1,919,063
CONVERTIBLE BODY OF VEHICLES
Filed Sept. 17, 1930 2 Sheets-Sheet 2
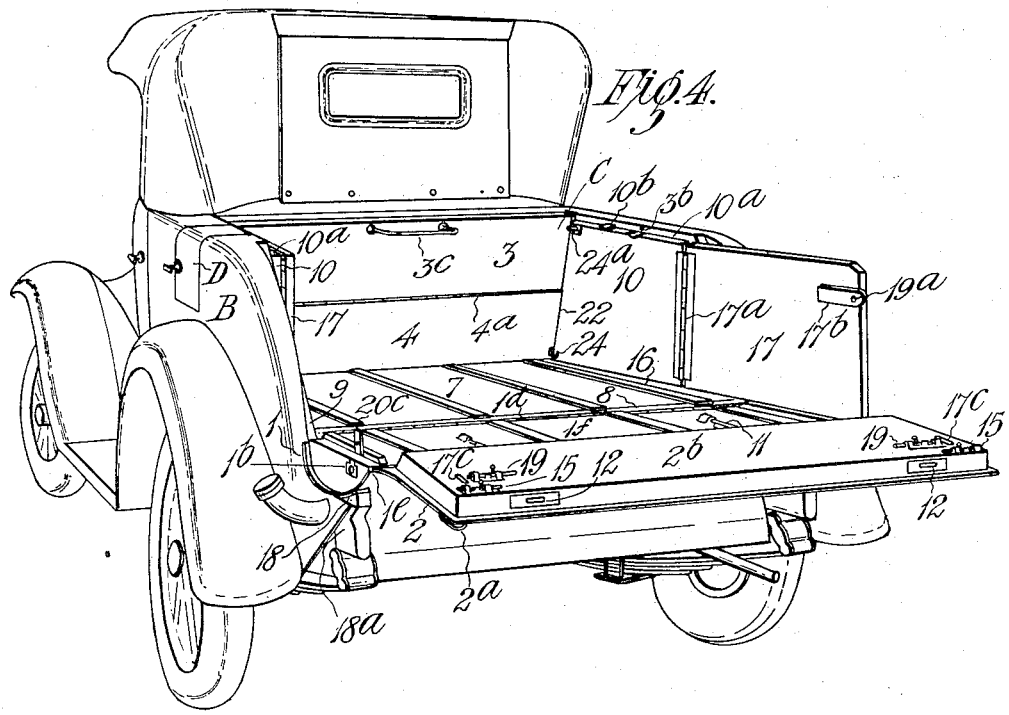
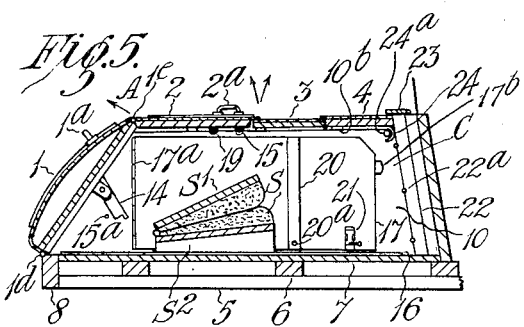
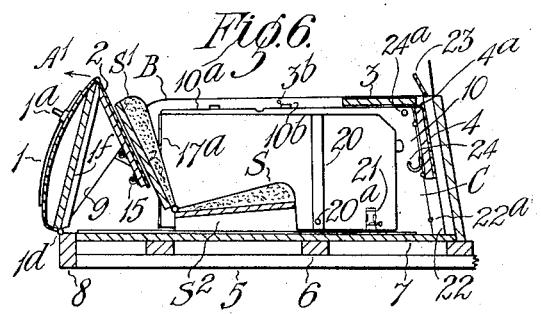
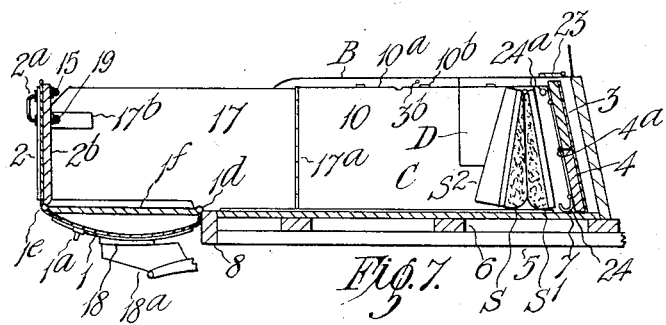
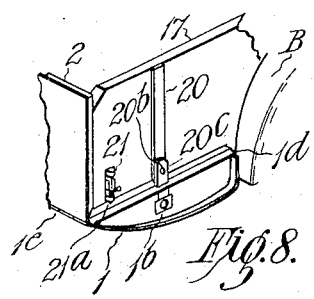
WARD HUBBARD
INVENTOR:
By 
his Attorney.

Patented July 18, 1933

1,919,063

UNITED STATES PATENT OFFICE

WARD HUBBARD, OF KOO-WEE-RUP, VICTORIA, AUSTRALIA

CONVERTIBLE BODY OF VEHICLES

Application filed September 17, 1930, Serial No. 482,435, and in Australia November 11, 1929.

One effect of my invention is to provide an improved vehicle body having rear parts which are easily adjustable to serve any of three purposes: (1) as the rear of a single seater motor car having a covered rear compartment; (2) as an open and spacious compartment containing seating as in the rear of a double seater car; and (3) as a truck to carry a relatively large load. Each adjustment can be made without the use of tools. The rear compartment has side walls, and adjustable covering flaps contoured to give the vehicle an appearance such as that of a single seater, and not a goods carrying, car; and the variability above referred to is useful to motorists who require considerable carrying space, farmers, travellers who use their cars to enable them to camp out, side car users, and so on.

The features of my invention are illustrated in the accompanying drawings, in which the scales vary; but various parts can be modified from what is shown while retaining at least some matter hereinafter claimed.

Figure 1 is a perspective view showing the rear of what appears to be an ordinary single seater car.

Figure 2 is a perspective view of the rear of Figure 1, opened so that the compartment can carry passengers, the near side wall being omitted.

Figure 3 is a perspective view showing the open compartment enlarged by setting a covering flap to form a floor extension, a flap still farther to the rear being available as a floor extension, or as a tailboard.

Figure 4 is a perspective view with the parts in truck position with the tailboard lowered, but the near side has not been extended to the rear.

Figure 5 is a side elevation in longitudinal vertical section of parts in Figure 1.

Figure 6 is a sectional side elevation showing the parts in Figure 5, but with some of them positioned as in Figure 2 and with seating set for use.

Figure 7 is a sectional side elevation of the parts set as a truck, the far side being extended to the rear, the tailboard closed, and the seat shifted to the front.

Figure 8 is a perspective of a rear corner of the truck.

Figure 9 is a perspective view showing front flaps of the compartment cover in a position in which they may be set.

B is the car body rear, containing when closed a relatively small compartment C, though I ordinarily make it larger than is usual in a single seater car. I provide a door D, at will at one or at each side for access to the compartment, which may contain a seat S, shown with a back $S^1$ which may be hinged and adjustable. The seat can be set at the front, as in Figure 7, or can be removed when more storage space is required.

A series of flaps 1, 2, 3, and 4, covers the compartment normally, and each has any suitable details, the exterior of flap 1 being shown curved, and the exterior of flap 2 plane, though it could be slightly curved. I ordinarily make flap 2 slightly inclined when closed—higher at its fore part.

Body B has suitable framing mounted on a chassis 5 being longitudinal side bars below transverse members 6 which support the compartment floor 7.

Rear framing includes a transverse member 8, to which is hinged at $1^d$ the rear flap 1, to the normally upper edge $1^e$ of which flap 2 is hinged. To facilitate its adjustment, flap 1 is shown with a handle $1^a$; flap 2 with a handle $2^a$; and flap 3 with a handle $3^c$ on the underside, to facilitate moving flaps 3 and 4 simultaneously. This would be done after movement of flaps 1 and 2, as described hereinafter.

Flap 1 is suitably held closed, by a spring pressed ball $1^b$, Figure 2, at each side entering a socket $1^c$, Figure 3. Flap 3 is suitably held closed, by a bolt $3^a$ at each side entering a socket $3^b$.

Each flap 2, 3, and 4, has any suitable support, shown as the upper surface $10^a$ of a lining 10 at each side of the body. Any suitable means of lessening the shock of flap movements in usable, what I show being rubber buffers $10^b$ on surfaces $10^a$.

Flap 3 is not permanently secured to flap 2, but these can be connected, when closed, and for that purpose I show locks 12, parts of which enter sockets 12ª; 12ᵇ being keyholes—see Figure 2. Flap 3 is jointed or hinged to flap 4 at 4ª.

At each side of the compartment—see Figures 2 to 4—there is an abutment 9 against which to rest flap 1 when the position of Figure 5 is assumed.

I provide at each side of the compartment a member 17 shown as a panel hinged to the side at 17ª.

To open the compartment for passenger use or to carry goods without requiring a greatly enlarged space, flap 1 is swung rearwardly—see arrow A in Figure 5, and see Figures 2 and 6—carrying with it flap 2, the rear of which rises while its front—when rearward of surfaces 10ª—descends and assumes an oblique position, an edge of the flap at each side engaging a socket or stop 14 on the body side. The outer surface of flap 2 in Figure 6 is at the rear of, and supports when required the seat back S¹. To hold flap 2 and therefore flap 1 also, as in Figures 2 and 6 any suitable means is used, shown as a bolt 15 at each side entering a compartment wall socket 15ª.

The seat could be slidable longitudinally; it is mounted in Figure 5 on rails S², which are suitably held, pins projecting from the base of each rail entering holes 16ª in the compartment floor 16.

Flaps 3 and 4 can be lifted and shifted to the front of the compartment, and are so shown in Figures 4 and 7, where they are secured suitably. Thus each flap side is held in a guideway 22. Movement into and from the guideways is facilitated by providing antifriction means, shown as rollers 22ª, on the walls 10. The flaps 3 and 4 can, however, be positioned so as to leave more of the compartment space clear. Thus in Figure 6, flap 3 is set about horizontal, on abutments or surfaces 10ª, and is usable as a shelf or table, and as a cover over anything placed below. I provide a catch 24 at each side of flap 4—see Figures 4, 6, and 7; and when flaps 3 and 4 are set clear of the guide 22 each catch engages a stud 24ª which is on the compartment side.

To produce the truck I swing flap 1 rearwardly from the position of Figure 2 till its outer face is underneath, as in Figure 3, where—see Figure 7—it rests on supports as buffers 18 on chassis brackets 18ª, rubber strips acting as buffers. Flap 2 is also swung outwardly—see arrow A¹ (Figure 6—and see Figure 7) and the extensions 17 are swung to the rear, from their positions in Figure 5 to the positions in Figure 7.

I provide on each member 17 a plate 17ᵇ having a rearwardly extending lug, and at each side of flap 2 I provide a recess 17ᶜ which is entered by said lug when flap 2 is, for example, vertical. The flap is fastened in that position by shooting a bolt 19 on the flap into a socket 19ª in the plate 17ᵇ.

Each extension 17 is shown carrying a reinforcement bar 20, and a pin 20ª which enters—see Figure 8—a socket 20ᵇ in a lug 20ᶜ which projects from flap 1. This prevents the flap rising.

Each extension 17 carries a bolt 21 which, when the extension has been moved to the rear, is engaged with a socket 21ª in flap 1; but while the extension is in its inoperative position bolt 21 engages a socket 21ᵇ in the floor of the compartment—see Figure 3. In Figures 3, 4 and 7 the inner face 1ᶠ of flap 1 forms the rear of the truck floor.

Figures 3 and 4 show flap 2 nearly horizontal with its inner surface 2ᵇ as a further rearward extension of the truck floor. This flap can be held in that position, so that the space available for carrying goods is then greatly enlarged. As holding means I show bolts 11, on flap 1 entering sockets 11ª on flap 2.

When it is desirable to leave the carrying space wholly clear of flaps 3 and 4 I in some cases set them as in Figure 9, that is raised and folded above the compartment front. To allow of this the front of flap 4 is hinged at 4ᵇ to the body and a flange 3ᵈ at the corner of flap 3 is entered into a slot 3ᵉ on the body side.

23 is a transverse protective strip of suitable material which I ordinarily hinge to the body above the front of flap 4.

I claim:—

1. In a convertible vehicle body having a rear compartment comprising a stationary floor, a front wall and side walls, the combination therewith of a pair of interconnected flaps movably supported at the rear of the vehicle body, linings adjacent said side walls, extensions pivotally supported by said linings and movable forwardly and rearwardly of the vehicle said extensions when in rearward position providing vertical rearward continuations of said side walls, means for securing one of the flaps in rearwardly extended position to provide a rearward substantially horizontal continuation of the floor and means to secure the other flap in substantially vertical position in cooperative relation to the said extensions.

2. In a convertible vehicle body having a rear compartment comprising a stationary floor, a front wall and side walls, the combination therewith of an inner and an outer flap hingedly connected together and movably supported at the rear of the vehicle body, extensions of said side walls movable forwardly and rearwardly about a vertical line said extensions when in rearward position providing rearward vertical continuations of said side walls and when in forward position extending substantially parallel to the side walls within the compartment, means for securing the inner flap in a substantially upright position at the rear of the floor and means for supporting the outer flap in an inclined position to serve as a rest for part of a seat.

3. In combination with a passenger vehicle body having a rear compartment comprising a stationary floor, front and side walls, a plurality of flaps movably connected to the front and to the rear of said compartment, lateral flaps movably connected to the side walls, said lateral flaps abutting in folded position said walls and forming extension walls thereto in unfolded position, fastening means to hold the unfolded rear flaps in a position to form an extension of the said floor, whereby the vehicle body in folded position of the flaps is usuable as and has the appearance of a passenger vehicle, whereas the flaps in unfolded position enclose a comparatively large loading space and give the vehicle body the appearance of a truck.

4. A vehicle, as claimed in claim 3, in which said fastening means connects the lateral flaps and rear flaps and further fastening means secures the last rear flap to the lateral flaps in a substantially vertical position.

5. A vehicle as claimed in claim 3, in which said rear and front flaps each comprise two interconnected sections movably connected to the rear and front, respectively, of the said compartment.

6. A vehicle as claimed in claim 3, in which the plurality of flaps are arranged to include two interconnected rear flaps and a single front flap.

7. A vehicle as claimed in claim 3, in which the plurality of flaps are arranged to include two interconnected front flaps, guides to movably support said front flaps along the said front wall, said front flaps covering in unfolded position the front wall and in folded position covering the compartment in cooperation with the folded rear flaps.

WARD HUBBARD.